(12) United States Patent
Wang et al.

(10) Patent No.: US 7,329,028 B2
(45) Date of Patent: Feb. 12, 2008

(54) UNIFORM LIGHT GENERATING SYSTEM FOR ADJUSTING OUTPUT BRIGHTNESS AND METHOD OF USING THE SAME

(75) Inventors: Bily Wang, Hsin Chu (TW);
Chih-Ming Wang, Hsinchu (TW);
Kuei-Pao Chen, Hsinchu (TW)

(73) Assignee: Youngtek Electronics Corporation, Hsinchu (TW)

( * ) Notice: Subject to any disclaimer, the term of this patent is extended or adjusted under 35 U.S.C. 154(b) by 35 days.

(21) Appl. No.: 11/471,560

(22) Filed: Jun. 21, 2006

(65) Prior Publication Data
US 2007/0297176 A1    Dec. 27, 2007

(51) Int. Cl.
*F21V 33/00* (2006.01)
(52) U.S. Cl. .................. 362/324; 362/283; 362/284; 362/293; 362/322; 362/558; 362/809
(58) Field of Classification Search ........ 362/558–560, 362/322–324, 216, 809, 331, 280, 293, 277, 362/282–284
See application file for complete search history.

(56) References Cited
U.S. PATENT DOCUMENTS

| | | | |
|---|---|---|---|
| 4,309,746 A | * | 1/1982 | Rushworth .................. 362/259 |
| 5,339,382 A | * | 8/1994 | Whitehead .................. 385/146 |
| 5,558,421 A | * | 9/1996 | Guastella .................... 362/565 |
| 7,192,173 B2 | * | 3/2007 | Vaughnn ..................... 362/558 |
| 2007/0030666 A1 | * | 2/2007 | Cohen ......................... 362/84 |

* cited by examiner

*Primary Examiner*—Laura Tso
(74) *Attorney, Agent, or Firm*—Rosenberg, Klein & Lee

(57) ABSTRACT

A uniform light generating system for adjusting output brightness, including a light-generating unit, a light-transmitting unit, a hollow spheroid unit, a light-sensing unit, and a control unit. The light-generating unit has a light-emitting element for generating light beams and a brightness control element for adjusting the luminous flux of the light beam. The hollow spheroid unit is communicated with the other side of the light-transmitting unit for guiding the light beams into an external casing of the hollow spheroid unit. The light-sensing unit detects electric power values in the external casing. The control unit is electrically connected to the light-generating unit and the light-sensing unit. Thereby a user can obtain a real illumination value via adjusting the illumination values of the light beams that are projected from the hollow spheroid unit.

26 Claims, 4 Drawing Sheets

UNIFORM LIGHT GENERATING SYSTEM FOR ADJUSTING OUTPUT BRIGHTNESS AND METHOD OF USING THE SAME

BACKGROUND OF THE INVENTION

1. Field of the Invention

The present invention relates to a uniform light generating system for adjusting output brightness and a method of using the same, and particularly relates to a system and a method for generating a uniform light beam and adjusting the illumination values of the uniform light beam.

2. Description of the Related Art

In general, an integrating sphere has a hollow spheroid unit, and the hollow spheroid unit has a plurality of output holes and input holes formed thereon. Moreover, the integrating sphere has a reflective board arranged in the hollow spheroid unit, and a reflective coating layer is coated on an inner wall of the hollow spheroid unit.

Firstly, a pre-measuring light beam is projected into the hollow spheroid unit from input holes; next the light beam is reflected and refracted via the reflective board and the inner wall for generating a uniform light beam. The uniform light beam is then projected out from the output holes for measuring. In this way, the integrating sphere is used to receive light beams and change the light beams into uniform light beams, and then project uniform light beams out from the output holes. Hence, a user can sample power, waveform and energy regarding the uniform light beam near the output hole for calculating original relevant parameters regarding projected light beams, such as LEDs.

SUMMARY OF THE INVENTION

The present invention provides a uniform light generating system for adjusting output brightness and a method of using the same. The system has a control unit electrically connected to a light-generating unit and a light-sensing unit to adjust illumination values of a uniform light beam that is projected from an integrating sphere for obtaining a real illumination values of the light beam. Hence a user can obtain different real illuminations according to different needs and needn't worry that the luminosity of the light-generating unit will decay over time with use.

A first aspect of the present invention is a uniform light generating system for adjusting output brightness, comprising: a light-generating unit, a light-transmitting unit, a hollow spheroid unit, a light-sensing unit and a control unit. The light-generating unit has a light-emitting element for generating light beams and a brightness control element for adjusting luminous flux regarding the light beam. The light-transmitting unit has one side communicating with the light-generating unit for receiving light beams passing through the brightness control element. The hollow spheroid unit has an external casing and a reflective element disposed in the external casing, wherein the hollow spheroid unit is communicated with the other side of the light-transmitting unit for guiding the light beam into the external casing, and the external casing has an output hole for projecting a uniform light beam. The light-sensing unit is used to detect electric power values in the external casing. The control unit is electrically connected to the light-generating unit and the light-sensing unit.

Moreover when the brightness control element is adjusted to generate different luminous fluxes regarding the light beam, a plurality of sets of real illumination values are obtained via a lux meter that detects the uniform light beams projected from the output hole and a plurality of sets of electric power values corresponding to the sets of real illumination values are obtained via the light-sensing unit to detect the light beam in the external casing. Furthermore, when controlling the brightness control element via the control unit to adjust the luminous flux of the light beam and comparing the sets of real illumination values with the corresponding sets of electric power values, the real illumination values projected from the output hole becomes known.

A second aspect of the present invention is a method of using a uniform light generating system for adjusting output brightness, comprising: projecting a light beam to a brightness control element of a light-generating unit via a light-emitting element of the light-generating unit; adjusting the brightness control element for obtaining different luminous fluxes regarding the light beam; and transmitting the light beam from the brightness control element into an external casing of a hollow spheroid unit via a light-transmitting unit in which one side is communicated with the light-generating unit.

Moreover the method further comprises: changing the light beam into a uniform light beam in the external casing via a reflective element disposed in the external casing; simultaneously obtaining a plurality of sets of real illumination values via a lux meter to detect the uniform light beam projected from the output hole, and a plurality of sets of electric power values corresponding to the sets of real illumination values obtained via the light-sensing unit to detect the light beams in the external casing, according the different luminous fluxes regarding the light beam; and controlling the brightness control element via a control unit that is electrically connected between the light-generating unit and the light-sensing unit for adjusting luminous flux of the light beam and comparing the sets of real illumination values with the corresponding sets of electric power values, thereby a real illumination value projected from the output hole becomes known.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED BEST MOLDS

Figure 1:
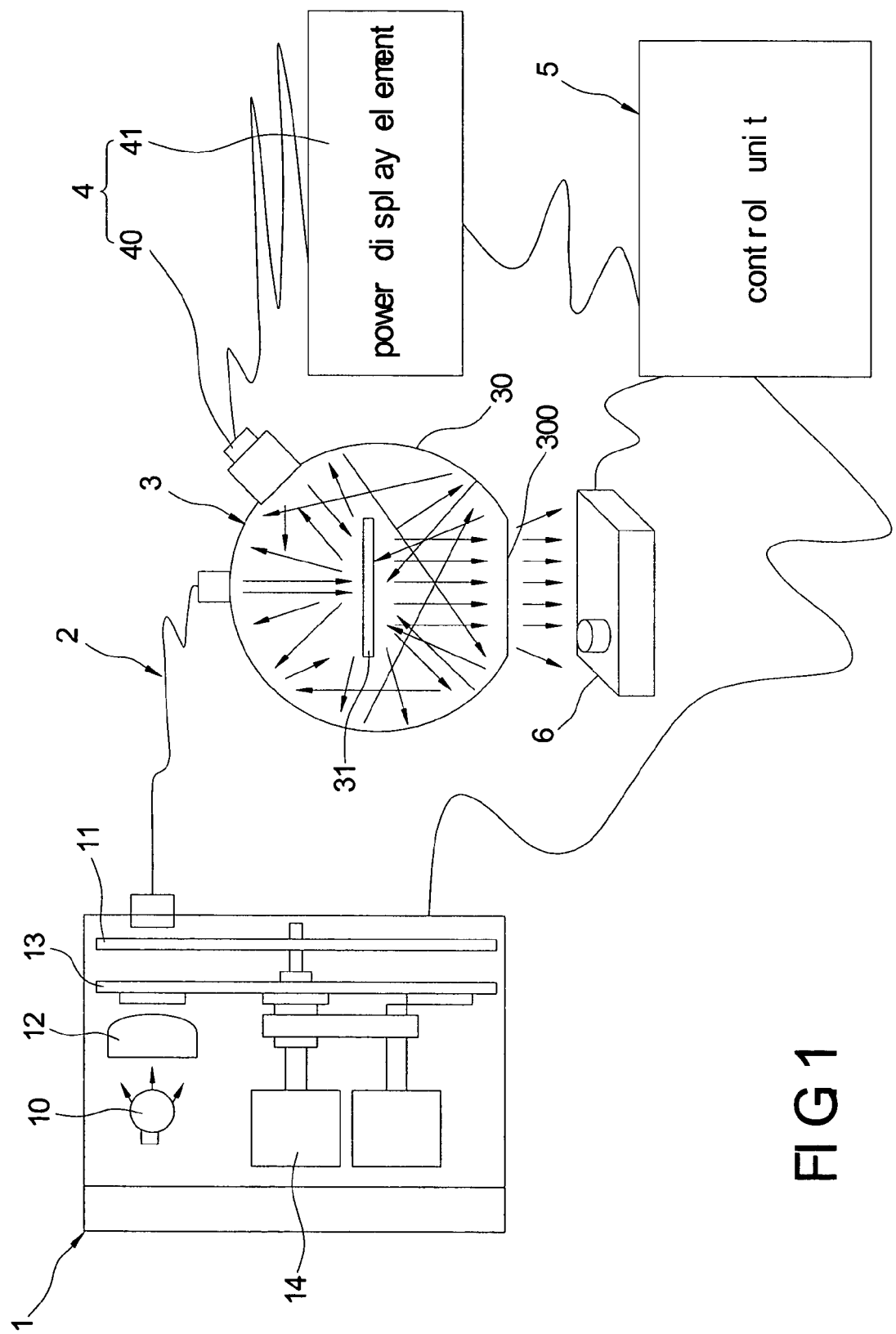
FIG. 1 is a function block diagram of a uniform light generating system for adjusting output brightness according to the present invention.
Figure 2:
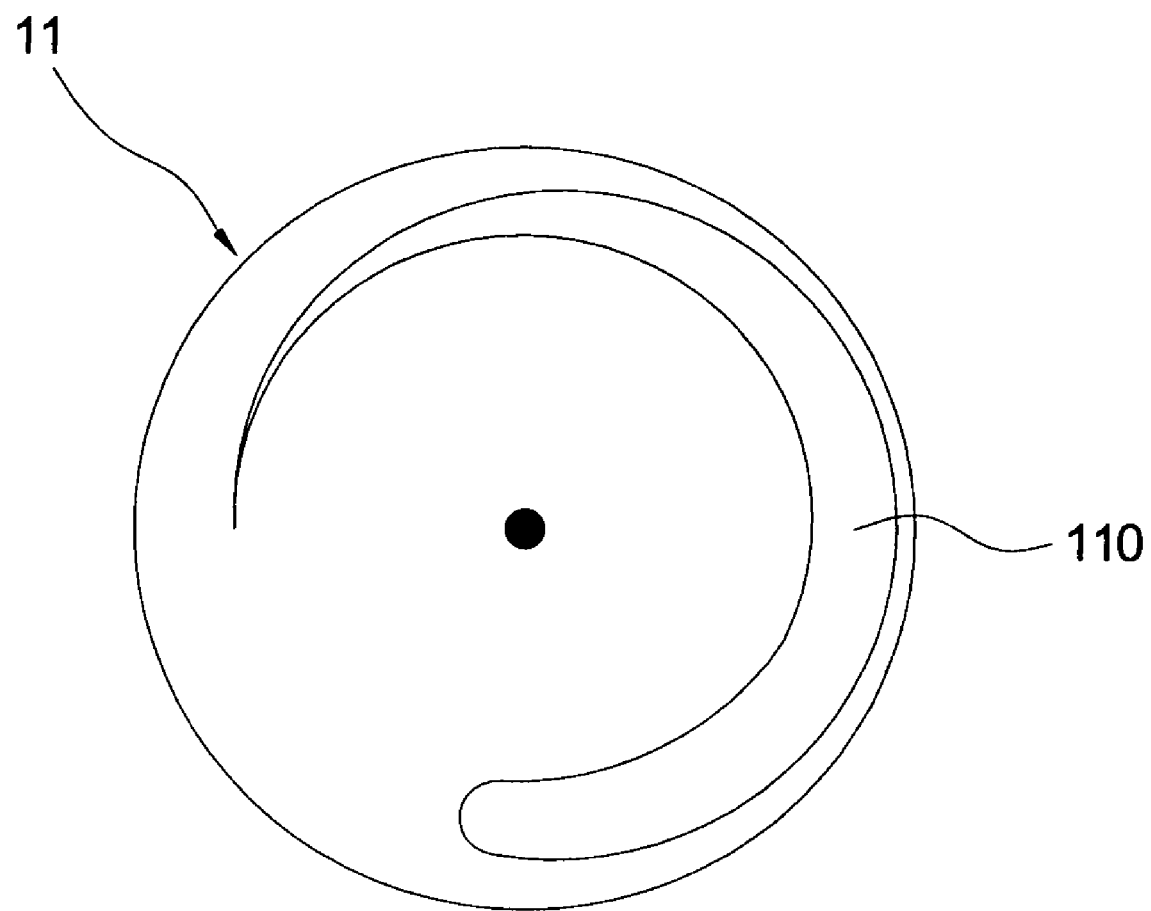
FIG. 2 is schematic diagram of a brightness control element of the present invention.
Figure 3:
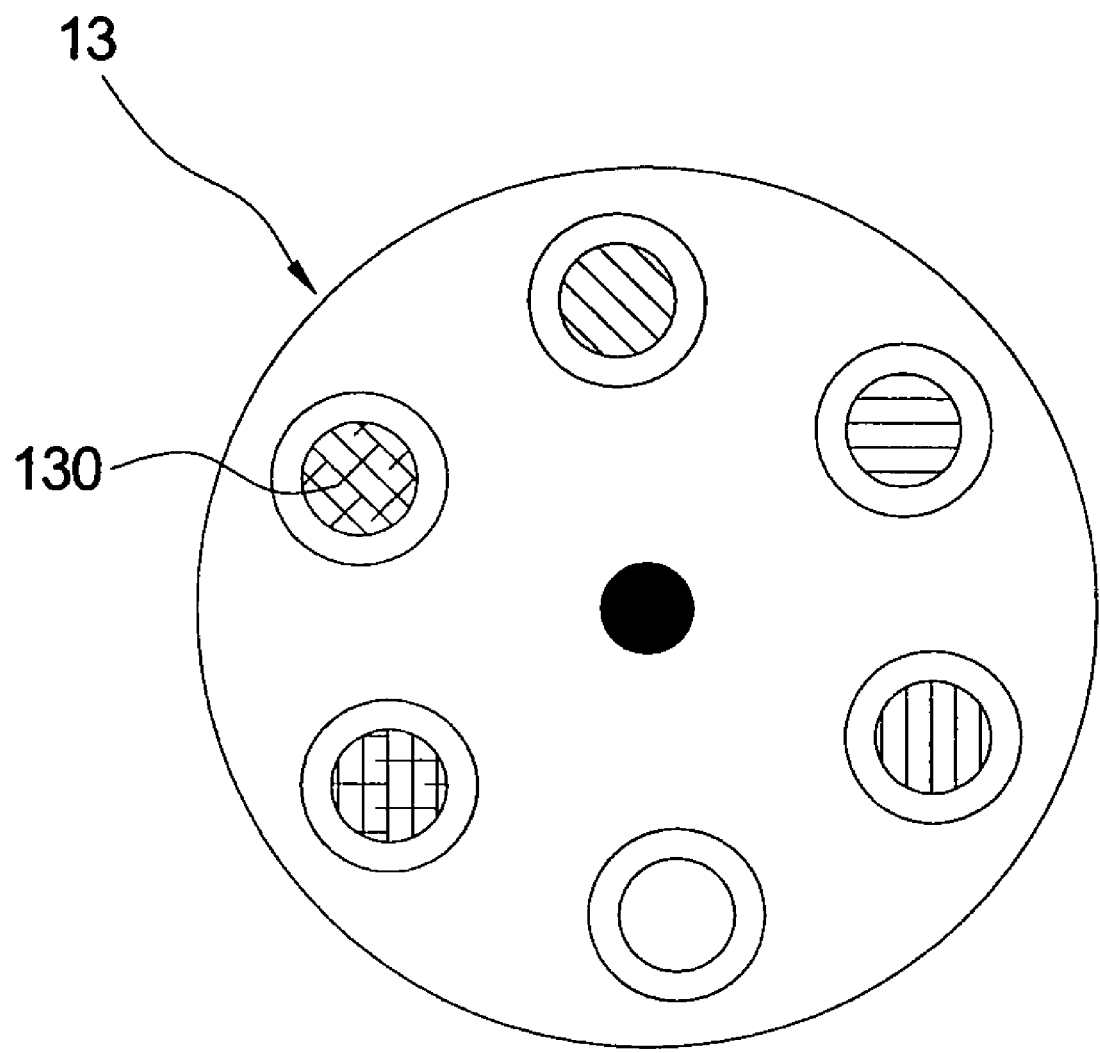
FIG. 3 is schematic diagram of a color filter element of the present invention.

Referring to FIGS. 1 to 3, the present invention provides a uniform light generating system for adjusting output brightness. The uniform light generating system includes a light-generating unit 1, a light-transmitting unit 2, a hollow spheroid unit 3, a light-sensing unit 4, and a control unit 5.

The light-generating unit 1 has a light-emitting element 10, a brightness control element 11, a condensing element 12, a color filter element 13, and a drive motor 14. The light-emitting element 10 is used to generate a light beam and the brightness control element 11 is used to adjust the light beam's luminous flux. In addition the brightness control element 11 can be a stepless brightness control turret (as shown in FIG. 2). The stepless brightness control turret has a ring opening 110 which has a crescent shape. Rotating the control turret controls the light beam's luminous flux that is projected from the light-emitting element.

Moreover, the condensing element 12 is disposed between the light-emitting element 10 and the brightness control element 11. The color filter element 13 is disposed between the condensing element 12 and the brightness control element 11, and the color filter element 13 can be a color filter turret (shown as FIG. 3) for generating a single colored light or a white light with different waves. In addition the drive motor 14 can drive both the brightness control element 11 and the color filter element 13 for controlling the brightness control element 11 and/or the color filter element 13 to rotate to any position.

Furthermore, the light-transmitting unit 2 has one side communicated with the light-generating unit 1 for receiving the light beam passing through the brightness control element 11. The light-transmitting unit 2 can be an optical fiber or any transmission line for making the light beam a similar parallel light.

In addition, the hollow spheroid unit 3 is an integrating sphere, and the hollow spheroid unit 3 has an external casing 30 and a reflective element 31 disposed in the external casing 30. Moreover, the external casing 30 has a barium layer coated on an inner surface thereof. The hollow spheroid unit 3 is communicated with the other side of the light-transmitting unit 2 for guiding the light beam into the external casing 30, and the external casing 30 has an output hole 300 for projecting uniform light beam.

Moreover, the light-sensing unit 4 has a photoelectric-transforming element 40 and a power display element 41. The photoelectric-transforming element 40 is used to detect lumen values in the external casing 30 and transform the lumen values into the electric power values 11. The power display element 41 can be a picoampere meter or any display device for displaying the electric power value. In addition the control unit 5 is electrically connected to the light-generating unit 1 and the light-sensing unit 4, and the control unit 5 can be a computer or any other kind of control device.

Hence when a user adjusts the brightness control element 11 to generate different luminous fluxes regarding the light beam, a plurality of sets of real illumination values are obtained via a lux meter 6 to detect the uniform light beams projected from the output hole 300 and a plurality of sets of electric power values corresponding to the sets of real illumination values are obtained via the light-sensing unit 4 to detect the light beam in the external casing 30.

Moreover when controlling the brightness control element 11 via the control unit 5 to adjust the light beam's luminous flux and compare the sets of real illumination values with the corresponding sets of electric power values, a real illumination value projected from the output hole will become known. Hence a user can obtain different real illuminations according to different needs and needn't worry that the luminosity of the light-generating unit 1 will decay over time with use.

Figure 4:
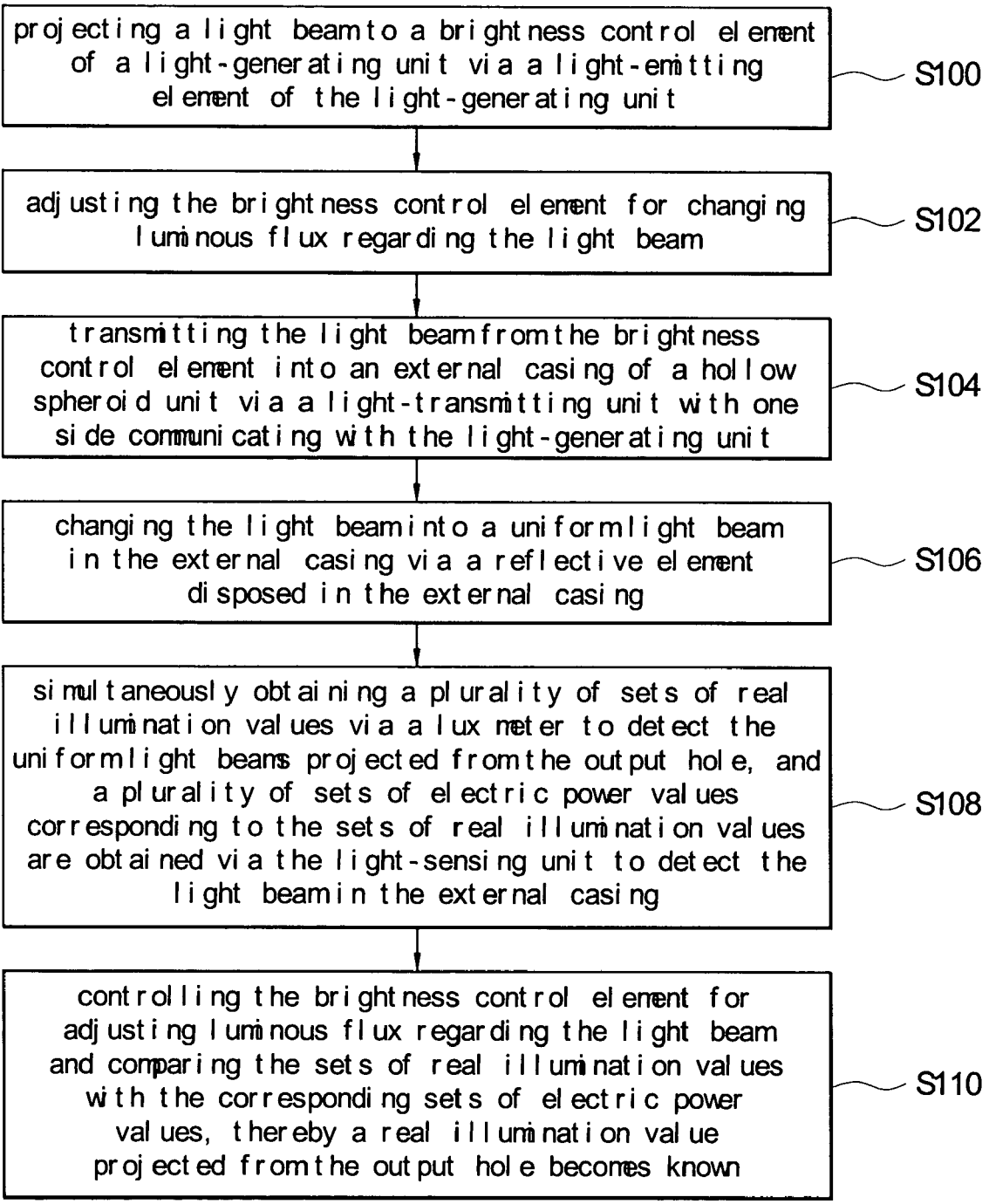
FIG. 4 is a flowchart of a method of using a uniform light generating system for adjusting output brightness according to the present invention.

FIG. 4 shows a flowchart of a method of using a uniform light generating system for adjusting output brightness according to the present invention. The method includes: projecting a light beam to a brightness control element 11 of a light-generating unit 1 via a light-emitting element 10 of the light-generating unit 1 (S100); adjusting the brightness control element 11 for changing luminous flux regarding the light beam (S102); and, transmitting the light beam from the brightness control element 11 into an external casing 30 of a hollow spheroid unit 3 via a light-transmitting unit 2 with one side communicating with the light-generating unit 1 (S104).

Moreover the method further comprises: changing the light beam into a uniform light beam in the external casing 30 via a reflective element 31 disposed in the external casing 3 (S106); simultaneously obtaining a plurality of sets of real illumination values via a lux meter 6 to detect the uniform light beams projected from the output hole 300, and a plurality of sets of electric power values corresponding to the sets of real illumination values are obtained via the light-sensing unit 4 to detect the light beam in the external casing 30 (S108); and controlling the brightness control element 11 for adjusting luminous flux regarding the light beam and comparing the sets of real illumination values with the corresponding sets of electric power values, thereby a real illumination value projected from the output hole becomes known (S110). Hence the real illumination values projected from the output hole 300 is obtained via reading the electric power values shown in the power display element 41 of the light-sensing unit 4.

In conclusion, the present invention uses the control unit 5 to control the brightness control element 11 to adjust illumination values regarding light beams that are projected from the integrating sphere for obtaining real illumination values regarding the light beams. Hence users can obtain different real illuminations according to different needs and needn't worry that the luminosity of the light-generating unit 1 will decay over time with use.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A uniform light generating system for adjusting output brightness, comprising:
   a light-generating unit having a light-emitting element for generating light beams and a brightness control element for adjusting a luminous flux of the light beam;
   a light-transmitting unit having one side communicated with the light-generating unit for receiving the light beam passing through the brightness control element;
   a hollow spheroid unit having an external casing and a reflective element disposed in the external casing, wherein the hollow spheroid unit is communicated with the other side of the light-transmitting unit for guiding the light beam into the external casing, and the external casing has an output hole for projecting uniform light beams;
   a light-sensing unit for detecting electric power values in the external casing; and
   a control unit electrically connected to the light-generating unit and the light-sensing unit;

wherein when the brightness control element is adjusted to generate different luminous fluxes of the light beams, a plurality of sets of real illumination values are obtained via a lux meter to detect the uniform light beams projected from the output hole and a plurality of sets of electric power values corresponding to the sets of real illumination values are obtained via the light-sensing unit to detect the light beams in the external casing; wherein when controlling the brightness control element via the control unit to adjust the luminous flux of the light beams and comparing the sets of real illumination values with the corresponding sets of electric power values, a real illumination value projected from the output hole becomes known.

2. The uniform light generating system as claimed in claim 1, wherein the brightness control element is a stepless brightness control turret.

3. The uniform light generating system as claimed in claim 1, wherein the light-generating unit further comprises a condensing element disposed between the light-emitting element and the brightness control element.

4. The uniform light generating system as claimed in claim 3, wherein the light-generating unit further comprises a color filter element disposed between the condensing element and the brightness control element.

5. The uniform light generating system as claimed in claim 4, wherein the color filter element is a color filter turret.

6. The uniform light generating system as claimed in claim 4, wherein the light-generating unit further comprises a drive motor to drive the brightness control element and the color filter element for rotation.

7. The uniform light generating system as claimed in claim 1, wherein the light-transmitting unit is an optical fiber.

8. The uniform light generating system as claimed in claim 1, wherein the hollow spheroid unit is an integrating sphere.

9. The uniform light generating system as claimed in claim 1, wherein the external casing has a barium layer coated on an inner surface thereof.

10. The uniform light generating system as claimed in claim 1, wherein the light-sensing unit has a photoelectric-transforming element for detecting lumen values in the external casing and transforming the lumen values into the electric power values, and a power display element for displaying the electric power values.

11. The uniform light generating system as claimed in claim 10, wherein the power display element is a picoampere meter.

12. The uniform light generating system as claimed in claim 1, wherein the control unit is a computer.

13. A method of using a uniform light generating system for adjusting output brightness, comprising:
projecting a light beam to a brightness control element of a light-generating unit via a light-emitting element of the light-generating unit;
adjusting the brightness control element for obtaining different luminous fluxes regarding the light beam;
transmitting the light beam from the brightness control element into an external casing of a hollow spheroid unit via a light-transmitting unit with one side communicated with the light-generating unit;
changing the light beam into a uniform light beam in the external casing via a reflective element disposed in the external casing;
simultaneously obtaining a plurality of sets of real illumination values via a lux meter to detect the uniform light beams projected from the output hole, and a plurality of sets of electric power values corresponding to the sets of real illumination values via the light-sensing unit to detect the light beams in the external casing, according to the different luminous fluxes of the light beam; and
controlling the brightness control element via a control unit that is electrically connected between the light-generating unit and the light-sensing unit for adjusting luminous flux regarding the light beams and comparing the sets of real illumination values with the corresponding sets of electric power values, a real illumination values projected from the output hole becomes known.

14. The method as claimed in claim 13, wherein the brightness control element is a stepless brightness control turret.

15. The method as claimed in claim 13, wherein the light-generating unit further comprises a condensing element disposed between the light-emitting element and the brightness control element.

16. The method as claimed in claim 15, wherein the light-generating unit further comprises a color filter element disposed between the condensing element and the brightness control element.

17. The method as claimed in claim 16, wherein the light beams pass through the color filter element for generating a single colored light or a white light with different waves.

18. The method as claimed in claim 16, wherein the color filter element is a color filter turret.

19. The method as claimed in claim 16, wherein the light-generating unit further comprises a drive motor to drive the brightness control element and the color filter element for rotation.

20. The method as claimed in claim 13, wherein the light-transmitting unit is an optical fiber.

21. The method as claimed in claim 13, wherein the hollow spheroid unit is an integrating sphere.

22. The method as claimed in claim 13, wherein the external casing has a barium layer coated on an inner surface thereof.

23. The method as claimed in claim 13, wherein the light-sensing unit has a photoelectric-transforming element for detecting lumen values in the external casing and transforming the lumen values into the electric power values, and a power display element for displaying the electric power values.

24. The method as claimed in claim 23, wherein the power display element is a picoampere meter.

25. The method as claimed in claim 13, wherein the control unit is a computer.

26. The method as claimed in claim 13, wherein the real illumination values projected from the output hole become known via reading the electric power values shown in a power display element of the light-sensing unit.

* * * * *